United States Patent [19]

Miller

[11] Patent Number: 4,663,135
[45] Date of Patent: May 5, 1987

[54] CONVERSION OF OXIDES OF NITROGEN TO NITROGEN FOR POLLUTION ABATEMENT

[75] Inventor: Ralph Miller, Pleasantville, N.Y.

[73] Assignee: T-Thermal Inc., Conshohocken, Pa.

[21] Appl. No.: 812,514

[22] Filed: Dec. 23, 1985

[51] Int. Cl.$^4$ .............................................. C01B 21/00
[52] U.S. Cl. ..................................... 423/235; 423/351
[58] Field of Search .................... 423/235 D, 235, 239, 423/239 A, 351

[56] References Cited

U.S. PATENT DOCUMENTS

| | | | |
|---|---|---|---|
| 3,453,071 | 7/1969 | Schmitt et al. | 423/235 |
| 4,397,719 | 8/1983 | Yoshida | 423/351 |
| 4,419,333 | 12/1983 | Rues et al. | 423/235 |
| 4,427,503 | 1/1984 | Heilgeist | 423/351 |

Primary Examiner—Gregory A. Heller

[57] ABSTRACT

A process for removing oxides of nitrogen from a gas in which the molar ratio of NO to $NO_2$ is greater than 1. Sufficient NO is oxidized by the reaction $NO + 2HNO_3 = H_2O + 3NO_2$ by a solution whose $HNO_3$ concentration is maintained above about 20% to form a gas whose molar ratio of NO to $NO_2$ is close to 1. Substantially equivalent amounts of NO and $NO_2$ are absorbed by a solution whose pH is maintained below about 2 containing $HNO_3$ and dissolved $NH_3$. The absorbed oxides of nitrogen react with the dissolved $NH_3$ at a temperature above about 50° C. to form elemental nitrogen and water. The process can be carried out in several steps or in substantially one step.

6 Claims, 2 Drawing Figures

CONVERSION OF OXIDES OF NITROGEN TO NITROGEN FOR POLLUTION ABATEMENT

BACKGROUND OF THE INVENTION

This invention is concerned with gases containing oxides of nitrogen and, more particularly, with the removal of such oxides and their conversion to elemental nitrogen.

In many instances oxides of nitrogen-containing gas is to be vented to the atmosphere. Because nitrogen oxides have a deteoriative effect on human, plant and aquatic life as well as many inorganic substances, the amount permitted to enter the atmosphere is limited. Among gases containing oxides of nitrogen which have received and are continuing to receive attention are products of high temperature combustion, the gas leaving the absorption section of nitric acid plants, gas formed during organic nitrations and gas emitted from pickling operations employing nitric acid.

Nitric oxide is formed deliberately and in high yield by the catalytic oxidation of ammonia as the first step in nitric acid production. By well known procedures, efficiently carried out, close to 98% of the nitric oxide is recovered as nitric acid. It is difficult and expensive to remove oxides of nitrogen when their concentration is below about 2,000 parts per million. At this low level of concentration, their value is less than the cost of recovering them as useful products. High temperature products of combustion generally contain considerably less than 2,000 parts per million of oxides of nitrogen even when the fuel from which they originate contains some bound nitrogen such as is present in high molecular weight fuel oil, shale oil and many coals.

BACKGROUND OF THE PRIOR ART

A host of methods have been proposed to treat these gases many of which are mentioned in Hydrocarbon Processing, Oct. 1981 p. 115. The method studied the most is the selective conversion of the oxides of nitrogen to elemental nitrogen by reaction with ammonia or methane at an elevated temperature e.g. about 400° C. in the presence of a catalyst. A second method that has been practiced is described in U.S. Pat. No. 3,900,554 which consists of the introduction of ammonia into products of combustion when the products of combustion are at a temperature between about 850° C. and 1050° C. In this temperature range ammonia selectively reacts with NO to form nitrogen and water.

Under many circumstances the cost of employing these methods is tolerable if the reactants are at the required temperature level or can be raised to the required elevated temperature level at little cost. Such is the case, for instance when the high pressure gas flowing from the absorber of a nitric acid plant is about to enter the plant's power recovery gas expander. Lacking a fortunate circumstance of this nature, other methods have been proposed. These methods fall into two general categories, e.g. absorption of nitric oxide by an aqueous absorbent such as ferrous sulfate or a solution containing a ferrous ion chelate. A second category involves the oxidation of the nitric oxide to nitrogen dioxide using the oxygen in air followed by absorption in water or dilute $HNO_3$ or in an alkaline solution to recover nitric acid or an alkaline nitrate.

Those methods which employ the oxygen of the air require large volume equipment per pound of nitric oxide removed since all of them treat a very dilute gas mixture and are dependent upon the slow reaction $2NO + O_2 = 2NO_2$. The need to treat a dilute gas mixture is inherent in the problem. The oxidation of the NO with the oxygen in air is not. Although expensive, the oxidation can be accomplished by ozone or chlorine dioxide followed by absorption in water or alkali. Dissolved hydrogen peroxide and sodium chlorite will also oxidize NO to $NO_2$ and retain it as nitrate. After the $NO_2$ has been absorbed, the remaining gas can be vented to the atmosphere. The solution formed may present a disposal problem. While these procedures are effective, they do not convert the oxides of nitrogen to elemental nitrogen.

It is an object of this invention to convert oxides of nitrogen to elemental nitrogen.

It is a further object of this invention to be able to convert oxides of nitrogen to elemental nitrogen using readily available, inexpensive reagents.

Still another objective of this invention is to convert oxides of nitrogen to elemental nitrogen using readily available, inexpensive reagents while employing mild conditions. In this instance mild conditions means the invention can be carried effectively at pressures at or close to atmospheric and temperatures below 100° C. This does not preclude the use of higher pressures and temperatures but higher pressures and temperatures are not essential.

A further object of this invention is to convert oxides of nitrogen to elemental nitrogen using readily available, inexpensive reagents while employing mild conditions in simple equipment whose cost is not excessive considering the volume of gas treated and the results achieved.

An especially important objective of this invention is that it can be effectively carried out over a relatively wide range of conditions without incurring excessive consumption of reagents. Because of this feature of the invention, it has the characteristics of a fly wheel. Changes take place slowly providing the volume of gas to be treated is not increased appreciably beyond the gas handling capacity of any particular installation. Gas volumes below design capacity can be effectively treated at the expense of some unnecessary pumping cost. In absolute terms, pumping cost is a small expense item.

Gas mixtures containing free oxygen, nitric oxide, nitrogen dioxide, dinitrogen tetraoxide also contain extremely small amounts of dinitrogen trioxide. When water vapor is present, and invariably it is, then trace amounts of gaseous nitrous acid as well as nitric acid will also be present. In mixtures of this kind the amount of different gases which are present depends on the temperature, pressure and prior history of the mixture. Because of the variety of nitrogen compounds present in such mixtures, the vague term oxides of nitrogen is applied to them. This terminology of necessity is used herein.

In dealing with these mixtures it is possible to describe the end result of a particular treatment but to date the intermediate steps and mechanisms are not known with certainty. What is known is that nitric oxide does not react with water. Nitrogen dioxide or probably dinitrogen tetraoxide, in the absence of other gases, does react with water. As soon as dinitrogen tetraoxide reacts with water, disproportionation occurs and acidic nitrate and nitrite form. The nitrite formed is unstable. Gaseous NO evolves and more nitric acid is produced.

NO evolves because it is so slightly soluble in water. At 30° C., its solubility is 0.005 parts per 100 parts of water. The evolution of NO thus begins the formation of a more complex mixture. If oxygen is also present, the mixture becomes even more complex.

SUMMARY OF THE INVENTION

In this description a clear account will be given of each step. It must be understood that the mixtures involved may be more complex than will be indicated. Moreover, while the explanations may be incorrect, this will not prevent the desired results from being attained just as long as each step is carried out in accordance with the directions which are supplied below.

In most instances the gas mixtures containing oxides of nitrogen with which this invention is concerned, will have a molar ratio of NO to $NO_2$ appreciably greater than 1. For example, when treating high temperature products of combustion, the molar ratio of NO to $NO_2$ will be close to 9. When the molar ratio of NO to $NO_2$ is less than 1, the invention can be used. In such instances, which are rare, most of the $NO_2$ is converted to elemental nitrogen and part to nitric acid.

For the purposes of explanation it is convenient to assume only NO is present. The inventive concept is to be able to reduce NO to nitrogen using ammonia while employing the mild conditions cited above. This is accomplished by initially moving in the opposite direction i.e. oxidizing a part of the NO to $NO_2$. By initially converting part of the NO to $NO_2$ it becomes possible to react the NO and $NO_2$ with water to form nitrous acid, $HNO_2$. The $HNO_2$ so formed can oxidize $NH_3$ under mild conditions to form water and elemental nitrogen. If air is present or mixed with the gas, a part of the NO will be oxidized to $NO_2$. However, this is such a slow reaction that ordinarily it is of minor use. The use of nitric acid as the NO oxidation agent enables the oxidation to take place much more rapidly while also providing other advantages. There are a variety of ways to employ nitric acid in carrying out the invention. A number of them will be described. In general, if the gas containing the oxides of nitrogen is at a somewhat elevated temperature, e.g. above about 60° C., one method may be preferable. If the gas is at a lower temperature, a somewhat different procedure tends to be favored.

BRIEF DESCRIPTION OF THE DRAWINGS

FIG. 1 is provided to show the path taken by the gas in passing through the initial oxidation step in gas-liquid contactor (2), the absorption of $N_2O_3$ in gas-liquid contactor (6) followed by the venting of the gas from the process through the gas outlet duct (14). The oxidation of ammonia by nitrous acid takes place in heat exchanger-reactor (8) to form nitrogen and water. Nitrogen is separated from the solution in gas-liquid separator (10) and returned to gas-liquid contactor (6). The separated solution is cooled in heat exchanger (12) and returned to the $N_2O_3$ absorption step. FIG. 2 shows a more compact equipment arrangement which is preferred when space is available for the taller column.

DETAILED DESCRIPTION

Although there are no limits either to the upper or the lower concentration of oxides of nitrogen in a gas which can be effectively treated by this invention, in most instances the concentration will be below 3,000 parts per million. Very often the concentration will be materially less than 1,000 parts per million. The fact that the gas being treated contains such small concentrations of oxides of nitrogen influences the manner of practicing the invention. When the gas is warm, it is convenient to practice the invention as shown in FIG. 1.

Figure 1:
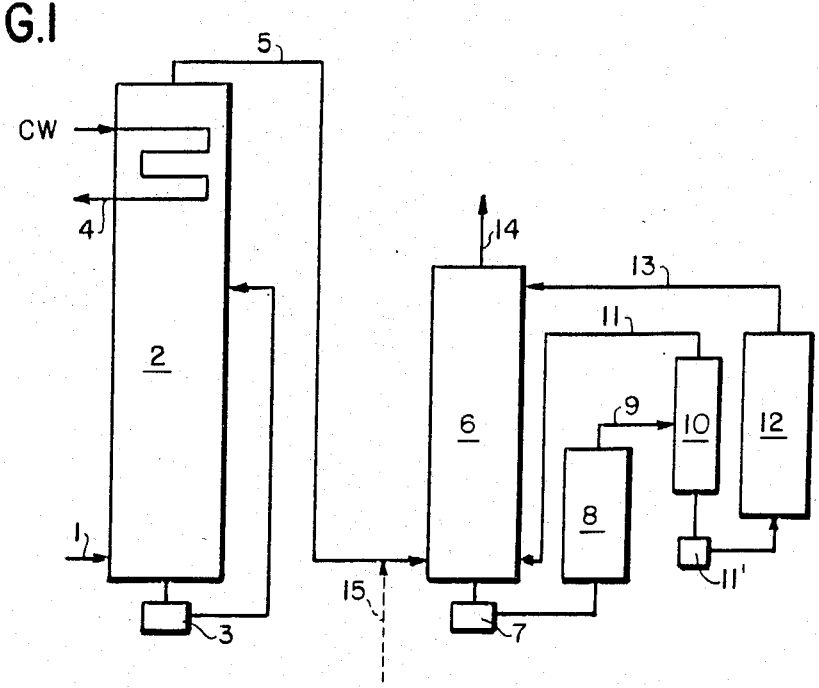
FIGS. 1 and 2 explain how the various steps of the invention relate to each other.

In FIG. 1 gas flowing in duct (1) enters gas-liquid contactor (2). The contactor can be a packed column with a gas inlet close to column's bottom. Nitric acid whose concentration is preferably maintained above 40% by any convenient means is circulated from the column's liquid bottom outlet by pump and piping (3) to an upper liquid inlet. The column contains two beds of packing. A lower bed which extends from a packing support installed a short distance above the gas inlet opening to a level slightly below the level at which the nitric acid reenters the column. The topmost section of the column is equipped with cooling coils (4). The upper bed of packing extends from a packing support installed a short distance above the level at which the nitric acid reenters the column to a level slightly below the bottom surface of the lowest cooling coil. In this method of employing the invention, the function of gas-liquid contactor (2) is to oxidize a sufficient fraction of the NO to $NO_2$ so that the molar ratio of NO to $NO_2$ is very close to 1. The gas flows upward in the column counter-current to the descending nitric acid solution. During the contacting between gas and liquid, NO is oxidized to $NO_2$. Simultaneously, some of the nitric acid is reduced to water and $NO_2$.

After the gas stream now enriched in $NO_2$ leaves the upper surface of the lower bed of packing, it contacts liquid flowing downward in the upper bed of packing. This liquid is condensate formed on the cooling coils. When incoming warm gas contacts the nitric acid solution, water and nitric acid vaporize. When the gas is cooled by the coils, nitric acid and water condense and flow downwards through the upper bed of packing.

As is known, at atmospheric pressure water and nitric acid form a maximum boiling point azeotrope whose concentration is 68% $HNO_3$. The vapor leaving the nitric acid solution, whose concentration is below that of the azeotrope, is enriched in water. Consequently, by proceeding as has been described, relatively dilute $HNO_3$ condenses on the coils and little or no nitric acid vapor is in the gas leaving gas-liquid contactor (2). Gas flows through duct (5) to a lower gas inlet in a second gas-liquid contactor (6).

Gas-liquid contactor (6) can also be in the form of a packed column. The $NO_2$ enriched gas flows upward in the column counter-current to a downward flowing cool nitric acid solution containing dissolved ammonium nitrate. The nitric acid solution has a concentration of about 25% and an ammonium nitrate concentration above about 5% the equivalent of 1% or preferably a higher percentage of dissolved ammonia. The temperature of the solution is preferably 25° C. to 30° C.

As the gas flows upwards counter-current to the down flowing absorbent, practically all of the oxides of nitrogen are absorbed provided the concentration of dissolved $N_2O_3$ or $HNO_2$ reaching the bottom outlet of the column is kept at a low level. In most instances $N_2O_3$ calculated as $HNO_2$ will have a concentration in the range of 0.15%–0.5%. This concentration is not critical. If circumstances make it economical to reduce the temperature of the absorbent liquid appreciably below 30° C., then the concentration of $HNO_2$ in the solution can be greater while still absorbing almost all of the oxides of nitrogen in the absorbent prior to the gas leaving the system. The molar ammonia concentration should be at least two to three times the $HNO_2$ molar concentration.

Conditions such as those described above can be varied depending upon the equipment employed, temperature and pressure. The critical aspect in this part of the process is to insure that the bulk of the NO plus $NO_2$ in the gas is absorbed and that at most only small amounts of NO subsequently evolve. Should some NO evolve later from the solution, most of it will be recaptured as will be made clear.

The absorbent solution fed to gas-liquid contactor (6) leaves the column through its bottom liquid outlet. It is then pumped by means of pump (7) through the second oxidation reactor (8) which is the form of a heat exchanger. The solution flowing through the heat exchanger is heated to a temperature above 50° C. and preferably to 70° C. to 100° C. The oxidation of $NH_3$ by $HNO_2$ takes place in solution at temperatures below 50° C. but the reaction takes place slowly. As the temperature is raised, the reaction goes much more rapidly. In addition, the presence of acid also speeds the reaction. This is one function the nitric acid serves. It also serves other functions. At the temperature in the absorber, nitric acid whose concentration is about 25% tends to stabilize $HNO_2$. It is also a strong enough oxidizing agent to oxidize NO so that NO which dissolves is oxidized in accordance with the reaction:

$$NO + 2HNO_3 = 3NO_2 + H_2O$$

The mixture of nitrogen and solution leaving reactor (8) passes through pipe (9) into gas-liquid separator (10). The gas leaving the gas outlet of the gas-liquid separator (10) flows through piping (11) into a second bottom gas inlet in gas-liquid contactor (6). Alternatively, the gas leaving gas-liquid separator (10) can be piped into a second gas inlet close to the bottom of gas-liquid contactor (2). This alternative is not shown.

In either case, any NO that evolves from the solution leaving gasliquid contactor (6) is treated so that it does not leave the process.

The solution leaving the liquid outlet of gas-liquid separator (10) is pumped by means of pump (11') through heat exchanger (12). In passing through heat exchanger (12), the solution is cooled and then by means of piping (13) is recycled to the liquid inlet of gas-liquid contactor (6). Although a large amount of solution is recycled through a heating and cooling cycle, the amount of heat added e.g. in the form of steam and the amount of cooling water used is modest. Savings in steam and cooling water are achieved by using a heat exchanger, not shown, strategically located.

The above equipment arrangement has been described in order to show one method by which the invention can be practiced. It also serves to illustrate the concept that unlike other methods of reducing NO to elemental nitrogen, nitric acid is used initially to form $N_2O_3$ and $HNO_2$ in the gas phase or $N_2O_3$ in the form of $HNO_2$ in the liquid phase which is then reduced at a relatively low temperature by ammonia to water and gaseous nitrogen.

A variation of the above procedure is to add gaseous ammonia to duct (5) at a location close to the entrance of the duct to gas-liquid contactor (6). The feed of gaseous ammonia is controlled so that substantially two moles of ammonia are added for each mole of $N_2O_3$ in the form of NO plus $NO_2$ passing into gas-liquid contactor (6). Dotted line (15) in the drawing represents the gaseous ammonia feed. The advantage of this arrangement is that it permits the 9aseous ammonia to mix quickly with the gas and react with the gaseous $HNO_2$ of which a small amount is always present in the vapor phase. Although the concentration of $HNO_2$ is always small, it forms rapidly. When the ammonia reacts with the $HNO_2$ present, the reaction product is quickly absorbed by the solution. Simultaneously, the $HNO_2$ equilibrium is displaced and more of it forms. As a consequence, fewer transfer stages are required to absorb almost all of the NO plus $NO_2$. When a controlled amount of gaseous ammonia is fed to the system in the manner described, none will escape since the gas is contacted with an acidic solution in gas-liquid contactor (6).

It will be appreciated that the system involved in carrying out this invention is not only complex but is dynamic in the sense that conditions are continuously changing as the gas moves through the equipment. It has been explained that a fundamental part of this invention is the oxidation of NO to $NO_2$ with nitric acid. Consequently, some, dissolved $N_2O_3$ in the form of $HNO_2$ is always present in the nitric acid used to carry out the NO oxidation. Advantage can be taken of this condition by having some dissolved ammonia in the nitric acid in the form of dissolved ammonium nitrate. By doing this some of the NO can be converted to elemental nitrogen in gas-liquid contactor (2).

It has been stated previously that the equipment arrangement shown in FIG. 1 and the explanation provided concerning the function of each equipment item was to explain and make clear the invention. Other types of equipment can also be used just as long as conditions are such that nitric acid is used to oxidize NO so that $HNO_2$ or $N_2O_3$ is formed which in turn oxidizes ammonia with resultant formation of elemental nitrogen and water.

Figure 2:
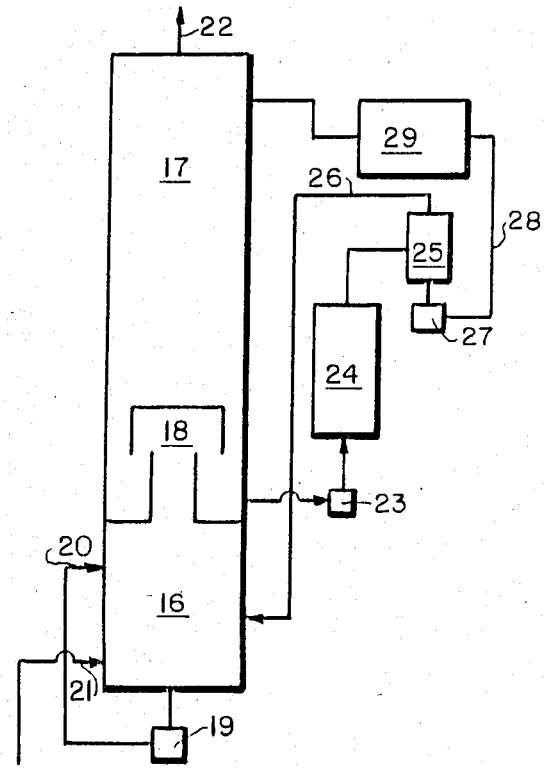

By modifying the design of the column it becomes possible to carry out the oxidation of the NO in the lower section of a column and the absorption of $N_2O_3$ in the column's upper section. This is achieved by equipping the column with a top hat arrangement such as diagrammatically shown in FIG. 2. When using an equipment arrangement such as shown in FIG. 2, the gas can be contacted with two solutions of different compositions at different temperatures. The lower section (16) of the column made up of sections (16), (17) and (18) contains packing or trays or any other means for obtaining intimate gas-liquid contacting. It is separated from the upper section (17), similarly equipped, by the top hat arrangement (18). Pump (19) circulates concentrated nitric acid from the liquid outlet at the bottom of the column through piping (20) into a liquid inlet located slightly below the gas outlet of the column's lower section (16). The oxides of nitrogen containing gas enters the lower section of the column through duct (21) and travels upward through both sections of the column counter-current to the downward flowing solutions in both sections of the column and out through exhaust duct (22).

Nitric acid whose concentration is preferably above about 40% containing some dissolved ammonium nitrate is circulated through the lower section of the column (16). Relatively cool nitric acid whose concentration is preferably in the range 25% to 30% is circulated through the upper section (17) of the column. This solution flows through a liquid outlet in the side of the column in the lower part of the top hat arrangement to the suction side of pump (23). The pump moves the solution through heat exchanger (24) in which its temperature is preferably raised to 70° C. to 100° C. and then into gas-liquid separator (25). The heat exchanger also serves as an oxidation reactor. At the increased temperature, dissolved $HNO_2$ oxidizes $NH_3$ to form elemental nitrogen and water. The gas and solution leaving heat exchanger (24) are separated in gas-liquid separator (25). The gas leaves through an upper gas outlet which is connected by piping (26) to a second gas inlet in the lower section (16) of the column. Pump (27) moves the separated solution out of a lower liquid outlet in the gas-liquid separator by means of piping (28) through heat exchanger (29) in which it is cooled preferably below about 30° C. The cool solution is returned to the upper section (17) of the column by way of a liquid inlet located a short distance below the outlet to duct (22).

It is stressed that although the process usually employs relatively dilute nitric acid, it is operable using highly concentrated solutions of nitric acid to oxidize the NO to $NO_2$. The more concentrated the acid employed, the greater is its vapor pressure and more of it vaporizes. The vented gas will contain the nitric acid vapor thus defeating the objective of the invention, unless provision is made to separate it from the outgoing gas.

To minimize the cost of carrying out the process, conditions are controlled to prevent the escape of any appreciable amount of nitric acid vapor in the outgoing gas. This is accomplished by minimizing the temperature of the outgoing gas as well as as controlling the nitric acid concentration at the lowest concentration at which $N_2O_3$ is absorbed and the resultant $HNO_2$ stabilized. In addition, as has been stated above, the presence of nitric acid speeds the oxidation of $NH_3$ by $HNO_2$ in the elevated temperature part of the process. Nitric acid whose concentration is in the vicinity of 25% to 30% also has the ability to oxidize NO to $NO_2$ at temperatures preferably in the range of approximately 25° C. to 30° C. and then retain the resultant $HNO_2$.

As has been stated previously, this invention deals with gas containing a small concentration of oxides of nitrogen. To minimize utility cost, the process should be carried out so that the temperature of the gas is not heated. As stated above, nitric acid at a concentration of about 25% will oxidize NO at ambient temperatures. If the gas to be processed is at ambient temperature, the oxidation of the NO as well as the absorption of $HNO_2$ or $N_2O_3$ is also preferably carried out at ambient temperature. Raising the temperature of the solution in which the oxidation takes place only speeds up the reaction. Although not shown in the drawings, heat can be exchanged between the hot solution leaving the gas-liquid separator with the cool solution containing the dissolved $HNO_2$. By keeping heat losses to the atmosphere to a minimum by effective insulation, the heat requirement of the process is small so that the overall economics are attractive.

In the description above, the preferred operating scheme uses concentrated nitric acid to oxidize the NO to $NO_2$ and less concentrated nitric acid to absorb $N_2O_3$ and stabilize the $HNO_2$ which forms in solution. It will be appreciated that it is not necessary to use concentrated $HNO_3$ to oxidize NO. To reiterate, concentrations in the vicinity of 25% are also operable. Consequently, the invention can be practiced using an acid whose concentration is sufficient, to both oxidize NO and retain the $HNO_2$. When operating under this condition, it is desirable to have the acid contain dissolved $NH_3$ in the form of ammonium nitrate.

It has been explained above that government regulations limit the permissable amount of oxides of nitrogen which may be vented to the atmosphere. In no instance is there the prohibition that no oxides of nitrogen can be vented. Consequently, the economic method of operating the invention is to remove such an amount of oxides of nitrogen that the residual gas may be lawfully vented. The residual gas need not have the minimum content of oxides of nitrogen the process can achieve. In the procedures described above the heating and cooling steps had the functions of recycling a solution substantially free from dissolved $HNO_2$. Cooling was used to decrease the nitric acid vapor pressure and increase the solutions absorptive capacity for NO and $N_2O_3$. The presence of dissolved $HNO_2$ causes the solution to have an $N_2O_3[-NO+NO_2]$ partial pressure. This limits the solution's capacity to absorb oxides of nitrogen to that of the equilibrium concentration in the gas phase. If the amount of oxides of nitrogen in the gas to be treated is small, although in excess of the amount which can be vented, the invention can be practiced without the need to recycle a solution free from $HNO_2$. The recycled $HNO_2$ concentration can be regulated so that just the desired amount of oxides of nitrogen are removed. In many instances this will permit the elimination of the heating and cooling steps, thereby allowing the process to operate at essentially constant temperature.

When operating without these additional steps, the gas is contacted with a solution whose nitric acid concentration is maintained in the vicinity of 20% to 25%—this is a concentration sufficiently high to oxidize NO to $NO_2$. In addition, by simple means the loss of nitric acid can be prevented. The solution should also contain ammonia in the form of dissolved ammonium nitrate. It is convenient to maintain the ammonia at a concentration preferably above 1 percent. This concentration is not critical. The nitric acid concentration must be high enough to oxidize NO to $NO_2$ at the temperature at which the gas-liquid contacting is carried out. Maintaining more than 1% of dissolved ammonia provides a sufficient excess so that its oxidation by $HNO_2$ takes place at an appreciable rate even when the $HNO_2$ concentration is low provided the solution is acidic as it is when operating in accordance with this invention.

In this version of the invention the solution of nitric acid containing dissolved ammonium nitrate is continuously contacted with the oxides of nitrogen-containing gas. Such a gas may be the products of combustion from a power plant. Such a gas will enter the process at a temperature of about 300° F. When the gas and solution come into contact, water vaporizes to saturate the gas. This has several beneficial effects. The increased water partial pressure speeds the reaction: $NO+NO_2+H_2O=2HNO_2$ and increases the concentration of $HNO_2$ in the vapor phase. This allows it to be absorbed more readily. The temperature of the gas is reduced. It and the solution will have temperatures in the range of about 120° F. to 135° F. At this temperature in the presence of the nitric acid the oxidation of the $NH_3$ by the $HNO_2$ takes place quickly enough to maintain the dissolved $HNO_2$ concentration at a low level so that the outgoing gas contains in the neighborhood of 100 parts per million of oxides of nitrogen, measured as $NO_2$.

Using make-up water to scrub the outgoing gas, absorbs any nitric acid that has vaporized.

It will be appreciated that the solution oxidizes enough NO to form the equivalent of a gas mixture containing a molar ratio of NO to $NO_2$ close to 1, it also absorbs or keeps in solution the resulting $N_2O_3$ to form dissolved $HNO_2$ and is also the oxidation reaction medium in which the elemental nitrogen is formed. The nitrogen is evolved from the solution and leaves with the vented gas.

When operating in this mode, that is, without separate heating and cooling steps, it is sometimes advantageous to separate the NO oxidation step from the ammonia oxidation step. The advantage of employing two gas-liquid contacting steps is it practically eliminates the loss of nitric acid with the outgoing gas. It has been explained above that the rate of oxidation of ammonia by nitrous acid is increased when the reaction takes place in an acidic solution. The increased oxidation rate takes place when the acidic solution has a pH below about 2. The pH can be obtained when the nitric acid concentration is far below 20%; a suitable concentration is as low as 2%.

As explained above, the oxides of nitrogen-containing gas whose molar ratio of NO to $NO_2$ is above 1 is contacted with nitric acid whose concentration concentration is maintained above about 25% to react that quantity of NO and nitric acid to form a gas whose molar ratio of NO to $NO_2$ is close to 1. The gas mixture formed is then contacted with ammonia in the gaseous or liquid phase. The amount of ammonia available should be not less than 2 moles for each mole contained in the gas of $N_2O_3$ which in large part is in the form of $NO+NO_2$.

When gaseous ammonia is added to the gas mixture leaving the nitric acid oxidation step, the resulting gas mixture is contacted with a nitric acid solution whose pH is less than 2. This solution will also contain some dissolved ammonium nitrate whose concentration is maintained above about 5%. During this contacting the $N_2O_3$ as such, or as $HNO_2$, or in the form of $NH_4NO_2$ or in all three forms are absorbed in the solution. In the acid solution the nitrous acid oxidizes dissolved ammonia to form elemental nitrogen and water. When the gas formed in the nitric acid oxidation step is contacted with ammonia in the liquid phase, the gas is contacted with essentially an ammonium nitrate solution containing enough excess nitric acid to maintain its pH below $-2$. As a result of this contacting, the $N_2O_3[NO+NO_2]$ is absorbed to form a solution containing nitrous acid. At the low pH, the nitrous acid oxidizes the dissolved ammonia. This oxidation reaction is slow at temperatures below 40° C. so it is desirable to contact the $N_2O_3[NO\ 30\ NO_2]$ - containing gas at a temperature of about 50° C. or somewhat higher. Under these conditions the reaction takes place at a rate such that the $HNO_2$ concentration remains small. By keeping the $HNO_2$ concentration low, the ability of the solution to continue to absorb the $N_2O_3[NO+NO_2]$ is maintained. Enough oxides of nitrogen are removed from the gas so that it can be legally vented.

A suitably elongated gas-liquid contact zone must be provided within which there must be means to generate adequate gas-liquid interfacial area to achieve the required degree of pollution abatement.

It is noteworthy that when using this process to treat a gas containing only NO, only one fourth of the NO in the gas must be oxidized to obtain the desired molar ratio of NO to $NO_2$ equal to 1. This low NO oxidation requirement enables the process to be carried out in less costly equipment than would be the case if some other method were employed to oxidize the NO. This saving in equipment cost generally more than compensates for the cost of the nitric acid consumed.

It is stressed that no particular type of equipment is essential to carry out this invention. What is required are means to enable nitric acid to oxidize enough of the NO in the gas to be processed so that the molar ratio of NO to $NO_2$ comes as close to 1 as is economically feasible to form $N_2O_3$ or $HNO_2$ and means to contact and react the resultant $HNO_2$ with $NH_3$ to form nitrogen and water.

What is claimed is:

1. The process for removing a portion of the oxides of nitrogen contained in a gas in which the molar ratio of NO to $NO_2$ is greater than 1 comprising the steps of:
    (a) contacting said gas with nitric acid whose concentration is maintained above about 20% to react enough of the NO and nitric acid to form a gas in which the molar ration of NO to $NO_2$ is close to 1;
    (b) contacting, at a temperature below about 50° C., the gas formed in step (a) with a solution whose nitric acid concentration is maintained above about 20% and ammonium nitrate concentration above about 5% to absorb substantially equal molar quantities of NO and $NO_2$ to form a solution enriched in nitrous acid and a gas with a diminished oxides of nitrogen content;
    (c) separating said gas from the solution enriched in nitrous acid;
    (d) heating said separated solution to a temperature above about 50° C. to react the dissolved nitrous acid with dissolved ammonia originating in the ammonium nitrate to form elemental nitrogen and water and separating the solution from the nitrogen;
    (e) cooling said separated solution and recycling it to step (b).

2. The process of claim 1 in which ammonium nitrate is also present in the solution used in step (a).

3. The process of claim 1 in which prior to gas contacting step (b) gaseous ammonia is added to the gas formed in step (a); substantially two moles of ammonia being added for each mole of $N_2O_3$ or its equivalent in the form of a mole of NO and a mole of $NO_2$ contained in said gas.

4. The process for removing a portion of the oxides of nitrogen contained in a gas in which the molar ratio of NO to NO is greater than 1 by converting said removed oxides of nitrogen to elemental nitrogen and water which comprises contacting at a temperature above about 50° C. said gas with a solution whose nitric acid concentration is maintained above about 20% and whose ammonium nitrate concentration is maintained above about 5% to absorb and react oxides of nitrogen with nitric acid and dissolved ammonia originating in the ammonium nitrate to form elemental nitrogen, water and a gas with a diminished content of oxides of nitrogen.

5. The process for removing a portion of the oxides of nitrogen contained in a gas whose molar ratio of NO to $NO_2$ is greater than 1 by converting the removed oxides of nitrogen to elemental nitrogen and water comprising the steps of:
    (a) contacting said gas with nitric acid whose concentration is maintained above about 20% to react enough of the NO and nitric acid to form a gas in which the molar ratio of NO to $NO_2$ is close to 1 and;

(b) contacting at a temperature above about 50° C. the gas formed in step (a) with a solution of nitric acid and ammonium nitrate whose pH is maintained below about 2 and whose ammonium nitrate concentration is maintained above about 5% to absorb and react said oxides of nitrogen with dissolved ammonia originating in the ammonium nitrate to form elemental nitrogen and water and a gas with a diminished content of oxides of nitrogen.

6. The process of claim 5 in which prior to the contacting and reaction step of step (b) gaseous ammonia is added to the gas formed in step (a); substantially two moles of ammonia being added to the gas formed in step (a) for each mole of $N_2O_3$ or its equivalent in the form of a mole of NO and a mole of $NO_2$ contained in said gas.

* * * * *